United States Patent [19]

Clampitt et al.

[11] 4,221,349
[45] Sep. 9, 1980

[54] AUTOMATIC FILM THREADING MECHANISM

[75] Inventors: Russell F. Clampitt, New Brighton; Edwin Kalash, Rockford; Dennis C. Schuette, New Hope; Melvin J. Straub, Plymouth, all of Minn.

[73] Assignee: Minnesota Mining & Manufacturing Company, St. Paul, Minn.

[21] Appl. No.: 36,160

[22] Filed: May 4, 1979

[51] Int. Cl.³ .................... G03B 1/04; G11B 15/32
[52] U.S. Cl. ............................. 242/192; 226/91
[58] Field of Search ............. 242/192, 198, 206–208; 226/91; 352/124

[56] References Cited

U.S. PATENT DOCUMENTS

| | | | |
|---|---|---|---|
| 3,536,276 | 10/1969 | Bundschuh et al. | 242/192 |
| 3,558,028 | 1/1971 | Wangerin | 242/208 |
| 3,599,897 | 8/1971 | Bunting | 226/91 |
| 3,684,360 | 8/1972 | Pammer | 352/124 |

Primary Examiner—Leonard D. Christian
Attorney, Agent, or Firm—Cruzan Alexander; Donald M. Sell; John C. Barnes

[57] ABSTRACT

An automatic film threading device adapted for use with cameras or projection devices will drive the free end of the roll of film from a magazine along a film path and into the equipment. The threading mechanism comprises a drive for the reel and means for spreading the mouth of the magazine to free the film from the magazine. A second member moves into contact with the outer surface of the wound film to strip the free end from the roll of film and thread the same into a nip area between two drive rollers. The stripping member is biased toward the wound roll of film and a roller near the stripping finger engages the outer convolution of the wound film to hold the roll as the stripping finger contacts the film to direct the free end of the film off the reel.

8 Claims, 7 Drawing Figures

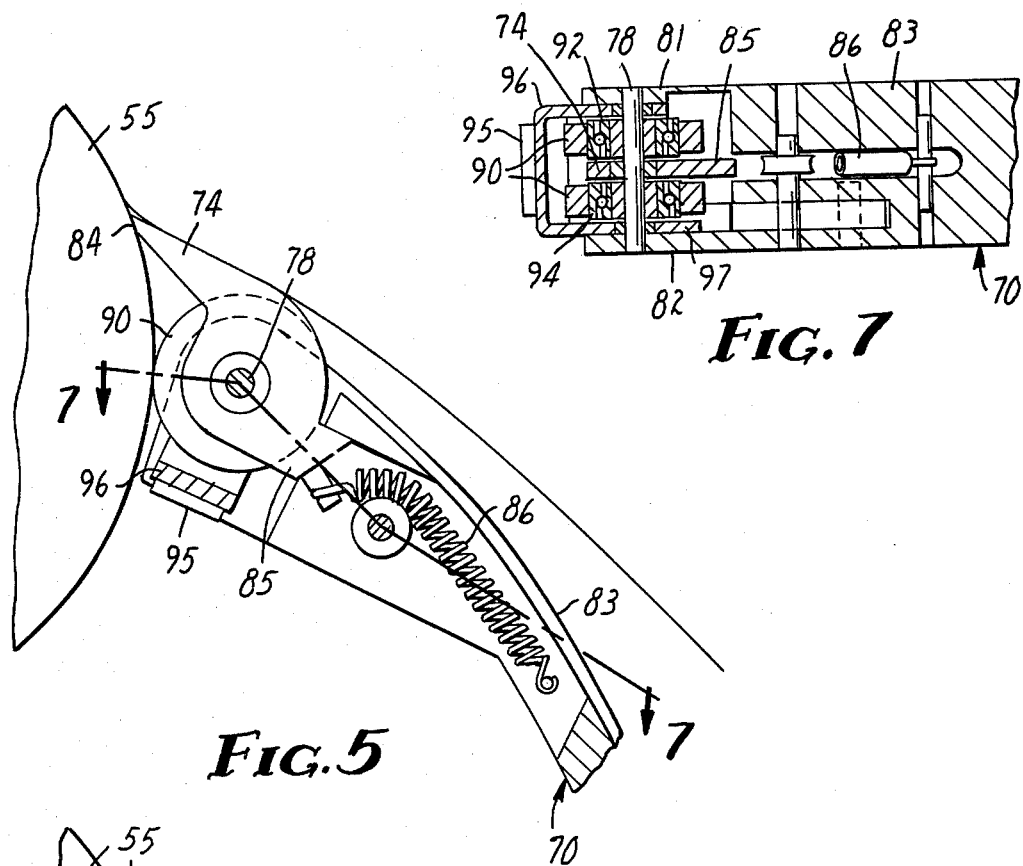
FIG. 7
FIG. 5
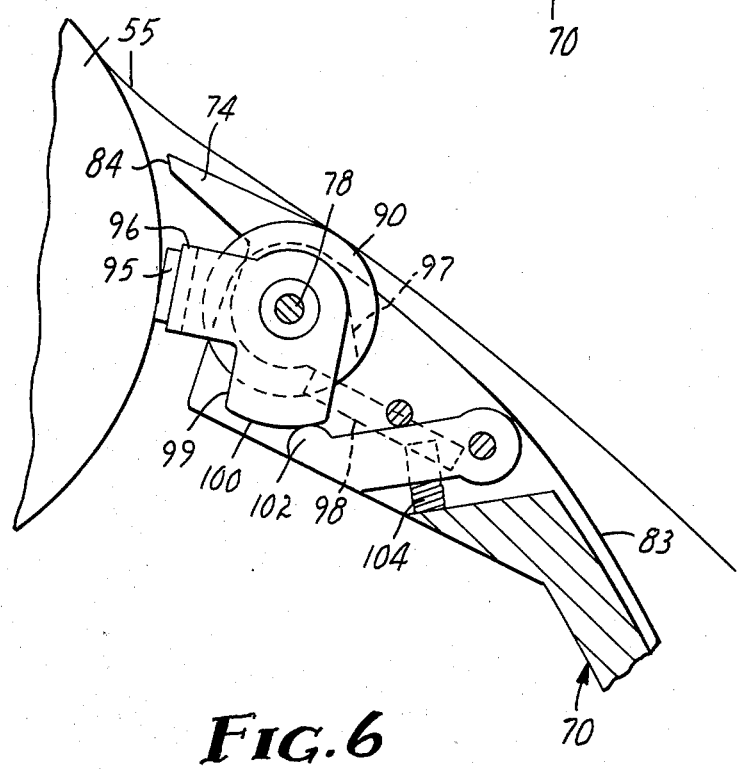
FIG. 6

AUTOMATIC FILM THREADING MECHANISM

BACKGROUND OF THE INVENTION

1. Field of the Invention

This invention relates to an automatic film threading apparatus for use with convolutely wound film in a magazine.

Automatic threading devices for threading the film from a roll of film on a reel, which reel may be rotatably disposed within a magazine is a well known field of inventive endeavor. There are several different methods for automatically threading the film from the reel, and one method is to place a stripping finger against the film and drive the film in such a manner that the free end will strike the stripping member and be directed thereby along a predetermined path to drive rollers which will then push and guide the film along a predetermined path into the photographic apparatus, be it a camera, a projection device or film reader of some type.

Examples of the use of a stripping member appear in U.S. Pat. No. 3,536,276, issued Oct. 27, 1969, to J. J. Bundschuh et al; U.S. Pat. No. 3,599,897, issued Aug. 17, 1971, to Wangerin; U.S. Pat. No. 3,558,028, issued Jan. 26, 1971, to Bunting; and U.S. Pat. No. 3,684,360, issued Aug. 15, 1972, to Pammer.

Characteristic of each of these devices is the use of a belt member which is moved through an opening in the magazine to contact the outer convolution of the wound film to drive the film in an unwinding direction to direct the free end of the film toward the stripper member. The exception to that is U.S. Pat. No. 3,599,897, wherein means are afforded for applying a squeezing force to the flanges of the film spool with sufficient force to cause successive portions of the film to be flexed such that the leading end of the film is flexed and straightened so the film end will be directed from the magazine. In the event of failure of the free end to be directed from the magazine, a manually inserted stripping member is moved into peripheral contact with the film roll to separate the leading end from the spool and to direct it off the spool and out of the magazine.

With the exception of U.S. Pat. No. 3,599,897, all of the threading mechanisms described utilize a stripping finger and utilize an auxiliary drive member which is moved through an opening in the magazine into contact with the outer convolution of the roll to drive it in an unwinding direction such that the free end will be directed toward the stripping member. In U.S. Pat. No. 3,599,897 the film is driven in an unwinding direction by the drive mechanism for the spool to drive the spool in an unwinding direction for threading and in a winding direction for rewinding the film into the magazine. In this device however the feeding mechanism requires the squeezing roller which engages the peripheral edges of the spool and is biased into engagement with those spool flanges to cause them to be squeezed together and contact the outer convolutions of the film to flex the same and direct them from the magazine.

The present invention utilizes the drive mechanism which is used to rewind the film into the magazine as the drive mechanism for automatically threading the film. This removes the necessity of providing an additional film threading drive mechanism as illustrated in the majority of the prior art patents referred to hereinabove. Further, the film is not subject to any transverse flexing to afford the threading. Further, the prior art teachings utilize a stripping member which is biased into contact with the film and the contacting frictional engagement is relatively controlled.

SUMMARY OF THE PRESENT INVENTION

The automatic threading device of the present invention is adapted for use with a cartridge which surrounds the convolutely wound film between the flanges of a film reel. The magazine has an opening in one peripheral wall permitting the same to be flexed to enlarge the diameter of a rib which surrounds the roll of film wound between the flanges of the spool. The automatic threading mechanism comprises means for automatically opening the throat of the magazine upon entry of the cartridge into the magazine receiving area of the photographic device, a drive means for driving the spool through the hub thereof, and a stripping member which is movable from a spaced nonengaging position to an engaging position. This stripping member comprises a shoe which engages the outer convolution of the wound film. Upon driving of the film in an unwinding direction this shoe will be rotated, allowing a roller to contact the film and position the stripping finger in closely spaced relationship with respect to the outer convolution of the film, such that it will direct the free end of the wound film off the spool, out the throat of the cartridge, and into a guide path where it will be picked up in the nip area between a drive spool and a pressure capstan. The film stripping member is adapted to be released from engagement with the film upon the film being threaded into the photographic device and the drive spool is withdrawn from the capstan to permit free movement of the film from the reel in the cartridge to a takeup reel in the photographic device.

DESCRIPTION OF THE DRAWING

The present invention will be further described with reference to the accompanying drawing wherein:

FIGS. 5 and 6 are enlarged detail views of the stripping member showing the parts in the two positions; and FIG. 7 is a vertical sectional view taken along the line 7—7 of FIG. 5.

Figure 1:
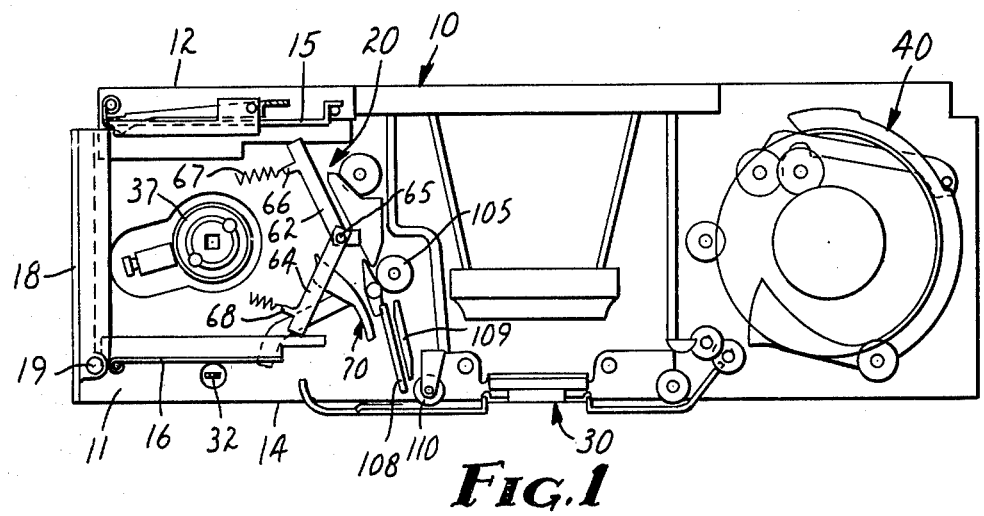
FIG. 1 is a fragmentary front elevational view of the automatic threading mechanism of the present invention, including schematically, the guide path for the film leading past a viewing area of the photographic device to the take-up reel for the film.

The automatic threading device of the present invention is adapted for use in a photographic device such as a camera, projector, or microfilm reader and/or printing device. As depicted in FIG. 1, the device may utilize a frame generally designated 10 on which is mounted the automatic threading mechanism generally designated 20, a film gate and projection area 30, and a film takeup mechanism generally designated 40.

Figure 2:
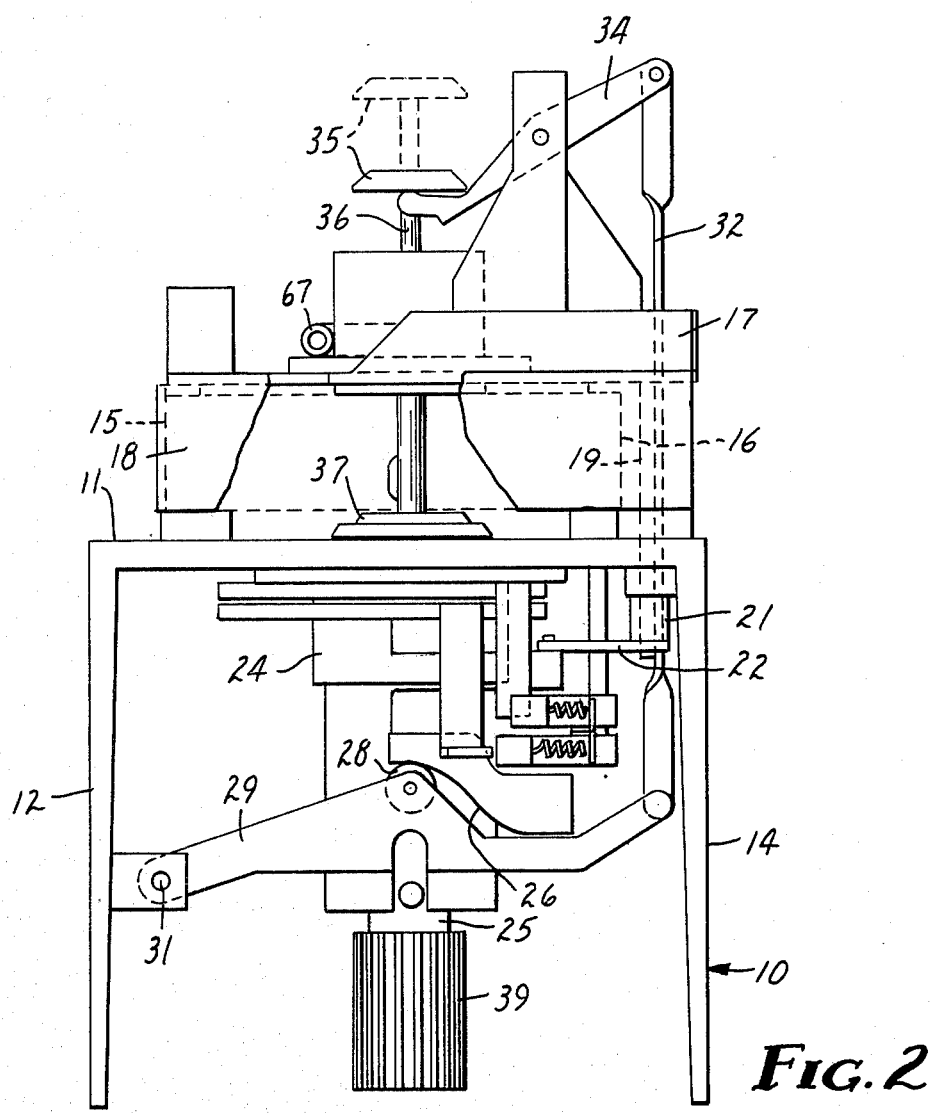
FIG. 2 is a detailed end view of the automatic threading apparatus disclosed in FIG. 1, showing the left end.

The frame 10 comprises a front plate 11 and top and bottom plates as shown in FIG. 2, designated 12 and 14 respectively. Projecting forwardly from the plate 11 are a pair of walls 15 and 16 which define a magazine for receiving the microfilm cartridge. This magazine also includes an outer plate 17 and a pivoted cover or door 18 whch serves as a lever to operate a mechanism which clears the magazine, permitting the insertion and removal of the film cartridge.

The door or cover 18 is supported from a shaft 19 which forms a pivot axis therefor, and which shaft extends through and is journalled in the plate 11 to be connected at its rearward free end with a crank arm 21 which arm is connected to one end of a link 22, the other end of which is pivotally connected to a rotatable cam 24 supported on a drive shaft 25. Rotation of the cover 18 from the position shown in FIG. 1 in a counterclockwise direction will thus rotate the cam 24, causing a cam surface 26 thereof to a drive cam follower 28 and pivot a link 29 in a clockwise direction about its pivot 31, causing a link 32 to be drawn rearward. The rearward movement of the link 32 pivots an arm 34, which arm is positioned beneath a head 35 of a drive pin 36 to raise the same from a position within the magazine to a position free thereof. The drive pin 36 in its normal position has the end thereof disposed in an opening in a drive hub 37 which is secured to the shaft 25 to afford a driving action to the pin 36 and to the spool hub through which it passes upon rotation of a gear 39 disposed on the rearward end of the shaft 25. The gear 39 receives a rotational driving movement from a drive train, not shown, driven from an electric motor and reduction and reversible gear drive.

Figure 3:
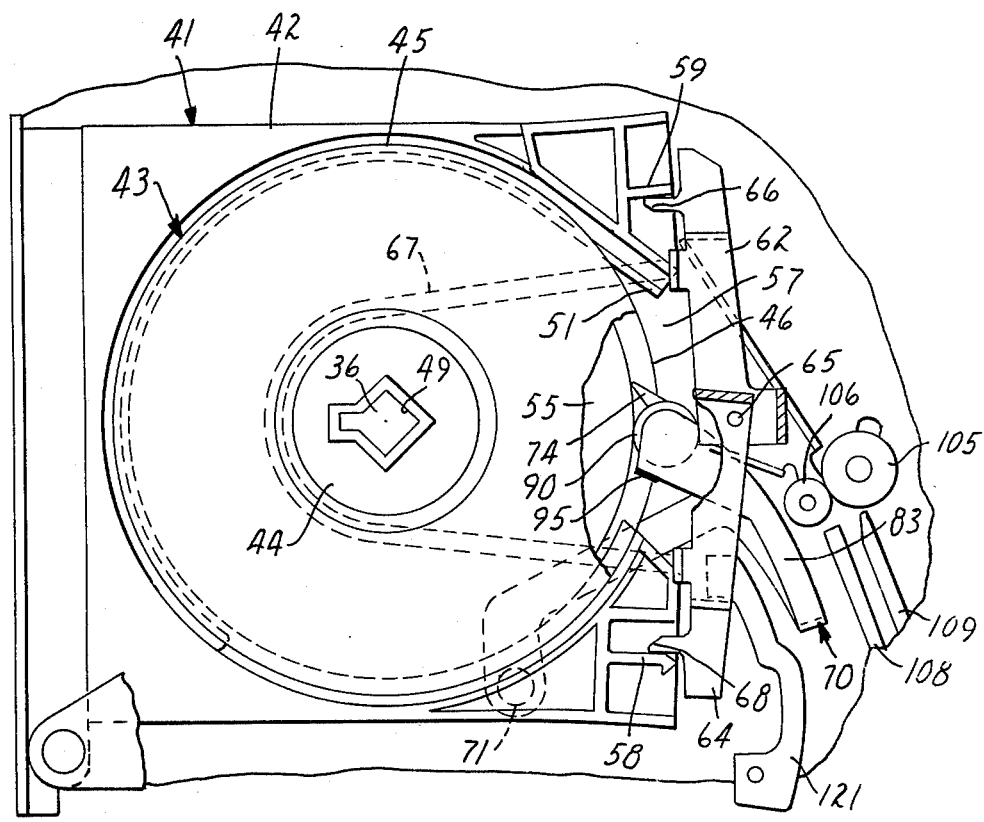
FIG. 3 is a fragmentary transverse sectional view of the automatic threading apparatus illustrating a cartridge positioned in the load magazine.

Referring now to FIG. 3 there is illustrated a film cartridge 41 comprising a shell 42 and a film reel 43 having a hub 44 and axially spaced reel flanges 45 and 46. The hub 44 has a central opening 49 shaped to receive the drive pin 36, as the same is moved into the magazine upon the closing movement of the cover 18. The container 42 is a standardized design and is generally rectangular with an enlarged central opening defined in part by a generally circular rib 51 which has a diameter less than the diameter of the reel flanges to fit therebetween and retain the outer convolution of the wound film 55 disposed between the reel flanges. The container 41 has an opening or throat 57 at one side as depicted in FIG. 3 where the side wall is discontinuous. Adjacent to this throat 57 are wall members 58 and 59 formed in the container on at least one side thereof to serve as support and reinforcing walls for the rib 51.

The film, as it is wound on the spool and stored in the container, tends to clockspring or loosen in the outer convolutions of the film, thus causing the outer convolution to contact the inner cylindrical surface of the rib 51. As the film cartridge is thus placed betwen the side walls 15 and 16, defining the magazine, the wall members 58 and 59 contact a pair of arms 62 and 64 which are pivoted on and diverge from a common pivot axis 65 adjacent one side of the magazine. The arms 62 and 64 are biased into the magazine by a spring 67 connected to each arm and extending around a hub supported on rear plate 17. The arms are provided with fingers 66 and 68 respectively, which engage the walls 58 and 59. As the cartridge is seated in the magazine, the fingers 66 and 68 cause the throat of the container 42 to open as the arms pivot outward, thus relieving any contact of the inner surface of the rib 51 from the outer convolution of the film adjacent the throat 57.

Upon energizing the automatic threading device 20 of the present invention, a threading or stripping member 70 is pivoted about the axis of shaft 71 to position a stripping finger 74 adjacent the outer convolution of the film. This stripping member 70 and the construction thereof will be more fully described hereinafter. The stripping member 70 is biased about the shaft 71 toward the center of the magazine and the hub of the spool 43 by a torsion spring 73, illustrated in FIG. 4, which surrounds the shaft 71 defining the axis and has its other end connected to a crank arm 75 which has a cam follower 76 which controls the position of the stripping member 70.

Referring now to FIGS. 5, 6 and 7, which illustrate in detail the free end of the stripping member 70, it will be noted that the stripping finger 74 is pivoted about a shaft 78 extending between opposite side walls 81 and 82 of an arcuate arm 83 of the member 70. The stripping finger 74 has the end thereof positioned to engage the film and is formed with a stripping surface having a predetermined angle of between 60° and 70° to a short land area 84 which land area is positioned to permit the edge formed therebetween to engage the outer convolutions of the film 55. The stripping finger 74 is provided with an extended end 85 opposite the land 84 which is connected to a tension spring 86 to rotate the same about the shaft 78 and drive the stripping finger 74 in a counterclockwise direction toward the film with respect to the shaft 78 and to lightly contact the film.

A pressure roller 90, which may comprise two rollers of equal diameter axially spaced along the shaft 78, is supported by suitable journalling means to provide very low friction such as the ballbearing structures 92 and 94, shown in FIG. 7. These pressure rollers are designed to rotate freely on the shaft 78 and to be placed in contact with the outer periphery of the wound film when the stripping member is in the operative position to transfer the biasing force from the spring 73 to the outer convolutions of the film 55 such that the entire film will be rotated about the drive pin 36. In the event the outer convolutions of the film are separated from the rest of the wound roll, these loose convolutions may adversely effect the initial threading operation. Therefore, it has been found to be beneficial to drive the film spool via drive pin 36 in the winding direction to tighten the film on the spool. To aid in this tightening operation when necessary, the threading member 70 is provided with a shoe 95 which is supported on the bight portion of a U-shaped member 96 pivotally supported from the shaft 78. One leg of the member 96 is formed with a laterally projecting portion 97 which contacts a stop pin 98, and the other leg has a radially projecting arm 99 formed on its outer surface with an arcuate area 100 which contacts the end of a frictional brake member 102 biased into contact with the surface 100 by a spring 104.

Thus, when the stripping member 70 is moved into the container to engage the film, the shoe is brought into position to engage the outer convolution of the film under the bias of spring 73. In this position the shoe 95 holds the stripping finger 74 from contact with the film. If it is desired to drive the hub in a winding direction, the shoe 95 is urged against the stop pin 98 and maintains a position to contact the outer convolution of the film and causes the film to clinch down onto the wound roll. Upon driving movement of the pin 36 in an unwinding direction, movement of the film causes the pad 95 to pivot freely against the resistance of the brake member 102 from the position shown in FIG. 6 to the position shown in FIG. 5, bringing the friction rollers 90 into engagement with the film, and the stripping finger 74 into contact with the film. The frictional bias of the rollers 90 against the film is such that a force is directed through the film such that rotation of the film causes rotation of all convolutions of the film, such that the outer convolution will be driven in an unwinding direction, so the free end thereof will move, in a clockwise direction to engage the end of the stripping finger 74 and thereby be directed away from the roll. The free end of the film is directed from the roll through the throat 57 of the cartridge into a film path toward a driven roller 105 (FIG. 1) and a pressure roller 106. The roller 105 is driven from the drive train, not shown, in a direction to move the free end of the film 55 between a pair of film guides 108 and 109, which confine the film and direct it about an idler roller 110 into the throat of the film guide 30 toward the takeup reel structure 40.

Upon a predetermined number of rotations of the spool 43 in an unwinding direction the film is either driven off of the spool or there has been a failure. Thus, it is believed to be preferred that after a predetermined number of rotations the drive to the pin 36 in the unwinding direction is interrupted. Within this the span or number of revolutions, the rollers 105 and 106 would pick up the film and drive the same between the guide plates 108 and 109 toward the takeup reel. As the film is moved toward the take up reel it is directed through various guides to the takeup reel whereupon the free end is caught and film is wound onto the takeup reel. When the film reaches the takeup reel it is desirable to remove the drive afforded by the drive roller 105 such that thereafter transfer of the film from the reel 43 to the takeup reel is handled by the drive of the takeup reel.

Figure 4:
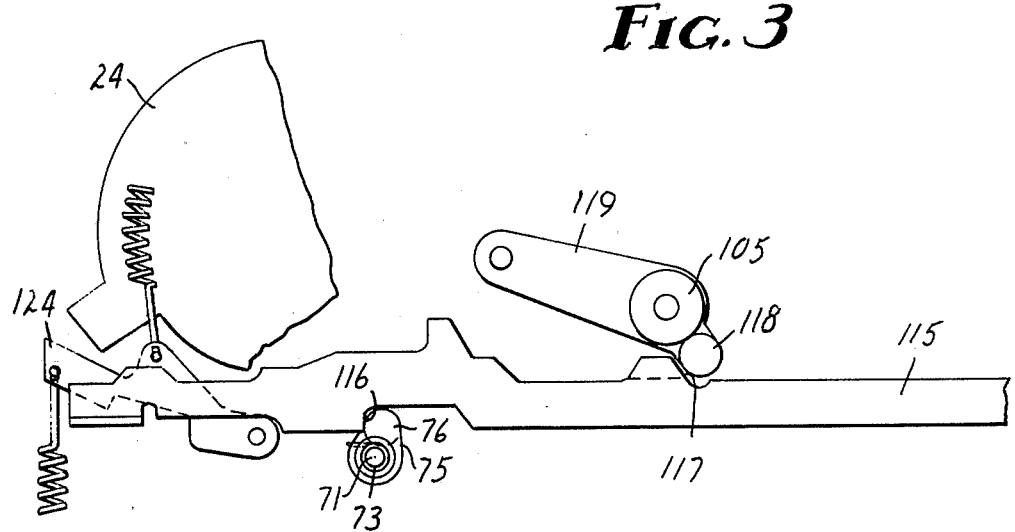
FIG. 4 is a detail view showing the release mechanism for the stripping member and film drive.

Release of the stripping member 70 and the contact of the drive roller 105 with the pressure roller 106 is afforded by movement of a cam arm 115 having thereon a cam surface 116 which drives the cam follower 76 as hereinbefore defined and a cam surface 117 which engages a cam follower 118 to pivot an arm 119 upon which the drive roller 105 is supported. Sliding movement of the cam arm 115 to the right as depicted in FIG. 4 will thus release the threading member 70 from the film, move it out of the cartridge and magazine and will pivot arm 119 to release the roller 105 from the film and pressure roller 106.

As the threading member 70 moves out of the magazine a reset blade 121 contacts the U-shaped member 96 adjacent the pad 95 to move it clockwise from the position shown in FIG. 5 to the position shown in FIG. 6.

In operation the cover 18 will be pivoted to an open position about the shaft 19 and the drive pin 36 will be pulled out of the magazine to permit a cartridge 41 to be inserted between the walls 15 and 16. As the cartridge is placed in the magazine the fingers 66 and 68 contact the walls 58 and 59 to open the container 42 near the discontinuity in the side thereof as the cartridge 41 is fully inserted. When the cover 18 is moved to the closed position the drive pin 36 moves through the opening 49 in the hub 44 and makes driving engagement with the drive spool 37. The closing of the cover and movement of the cam 24 releases a pawl 124 allowing the cam arm 115 to move to the position of FIG. 4 and cam surfaces 116 and 117 are retracted from the cam followers to bring the threading member 70 into the magazine and to move roller 105 against the pressure roller 106. The drive pin 36 is then rotated in an unwinding or clockwise direction as shown in FIG. 3 causing the pad 95 to rotate with the film and bring the rollers 90 and the stripping finger 74 against the outer convolutions of the film such that the driving force of the pin 36, through the frictional forces between the successive convolutions of the film will drive the outer convolution. The driving force between the layers of film will readily overcome the combined frictional force of the rollers 90 and the stripping finger 74 on the outer surface of the film. If the film appears to have the outer convolutions very loose the pin 36 may first be driven in a winding direction and the pad 95 will tighten the film on the reel. Then, upon driving in te unwinding direction, the free end of the outer convolution engages the stripping finger 74 it is directed out of the container 42 toward the nip formed between drive roller 105 and pressure roller 106. Upon the triggering of a sensing member or upon the drive pin 36 rotating a predetermined number of revolutions, i.e. 3½, the drive to the drive pin 36 is interrupted. Roller 105 drives the film through the film guides of the photographic device toward the takeup reel. When the film is driven a predetermined period of time the cam arm 115 is released and allowed to move to the right. Alternatively the device could be released when the film triggers a sensor at the takeup reel. The arm 115 withdraws the threading member 70 from the magazine, simultaneously resetting the pad 95 by the reset blade 121 and separating the drive roller 105 from the pressure roller 106. Further movement of the film is then controlled by the drive to the takeup reel and the drive pin 36 on the supply reel.

Having thus described the present invention with reference to the accompanying drawing it will be understood that various changes may be made in the appearance or structure of the various elements of the device illustrated without departing from the invention as defined by the claims appended thereto.

We claim:

1. An automatic threading mechanism for use with a film cartridge for threading the convoluted film from a reel in a cartridge into a photographic apparatus, said cartridge having a discontinuity in one side thereof allowing the film to exit, said automatic threading device comprising
   means defining a magazine for receiving the cartridge;
   a stripping member movable into the cartridge to engage the outer convolution of the film;
   drive means for rotating a reel in the magazine in either direction;
   wherein said stripping member comprises an arm supporting at one end thereof a pivotally mounted pad positioned to initially engage the wound film and movable away from the film upon movement of the film in an unwinding direction, stripping finger means for skiving the free end of the film from the roll of film and roller means engagable with the film for positioning the stripping finger means, for holding the outer convolutions of the film against the roll of film to cause rotation therefor with the roll, and spring means for biasing said one end of said arm toward the center of said magazine.

2. An automatic threading mechanism according to claim 1 including means adjacent said magazine for opening the cartridge at said discontinuity, said means comprising
   a pair of arms extending into the magazine and diverging from a pivot point adjacent one side of said magazine, and
   spring means for positioning and biasing said arms into the magazine.

3. An automatic threading mechanism according to claim 2 wherein said roller means comprises a pair of rollers journalled by ballbearings to reduce the rotational friction for the rollers below the frictional force developed between the layers of film.

4. An automatic threading mechanism according to claim 1 wherein said stripping finger means is pivoted in relation to the stripping member and means are provided for biasing said stripping member toward the film, said finger means comprises a surface positioned at an angle of between 60 and 70 degrees to a narrow land area to define an edge therebetween which engages the film.

5. An automatic threading mechanism according to claim 1 wherein said drive means comprises a driven spindle adapted to contact and drive the hub of the reel.

6. An automatic threading mechanism for use with a film cartridge for threading the convoluted film from a reel in a cartridge into a photographic apparatus, said cartridge having a discontinuity in one side thereof allowing the film to exit, said automatic threading device comprising means defining a magazine for receiving the cartridge;

a stripping member movable into the cartridge to engage the outer convolution of the film, said stripping member comprising an arm positioned to initially engage the wound film for skiving the free end of the film from the roll of film;

drive means for rotating a reel in the magazine in either direction; and means adjacent said magazine for opening the cartridge at said discontinuity, said means comprising a pair of arms extending into the magazine and diverging from a pivot point adjacent one side of said magazine, and spring means for positioning and biasing said arms into the magazine.

7. An automatic threading mechanism according to claim 6 wherein said stripping member comprises a pair of rollers engageable with the film to position said stripping member, means journalling said rollers to reduce the force between the outer convolution of the film and the rollers below the force needed to drive the outer convolution from the inner convolutions as afforded by said drive means for rotating a reel.

8. An automatic threading mechanism according to claim 7 wherein said means journalling said rollers are ballbearings which reduce the frictional drive on the rollers to reduce the force between the outer convolution of the film and the surface of the rollers below the force needed to drive the outer convolution from the inner convolutions as afforded by said drive means for rotating a reel.

* * * * *